United States Patent [19]

Michael

[11] Patent Number: 5,787,306
[45] Date of Patent: Jul. 28, 1998

[54] AUTOMATIC ASSIGNMENT OF I/O ADDRESSES IN A COMPUTER SYSTEM

[75] Inventor: Martin S. Michael, Santa Clara, Calif.

[73] Assignee: National Semiconductor Corporation, Santa Clara, Calif.

[21] Appl. No.: 245,315

[22] Filed: May 18, 1994

[51] Int. Cl.⁶ .................................................. G06F 12/00
[52] U.S. Cl. .............. 395/829; 395/800.01; 395/828; 395/830; 395/821; 395/823; 364/DIG. 1
[58] Field of Search .............. 395/800, 200.01, 395/800.01, 821, 823, 828, 830, 829; 364/DIG. 1

[56] References Cited

U.S. PATENT DOCUMENTS

| | | | |
|---|---|---|---|
| 4,354,258 | 10/1982 | Sato | 365/189.07 |
| 4,468,729 | 8/1984 | Schwartz | 395/497.03 |
| 4,660,141 | 4/1987 | Ceccon et al. | 395/829 |
| 4,727,475 | 2/1988 | Kiremidjian | 395/284 |
| 4,730,251 | 3/1988 | Aakre et al. | 395/284 |
| 4,980,850 | 12/1990 | Morgan | 364/900 |
| 5,038,320 | 8/1991 | Heath et al. | 395/830 |
| 5,243,700 | 9/1993 | Larsen et al. | 395/275 |
| 5,274,771 | 12/1993 | Hamilton et al. | 395/829 |
| 5,301,276 | 4/1994 | Kimura | 395/829 |
| 5,428,748 | 6/1995 | Davidson et al. | 395/275 |
| 5,524,269 | 6/1996 | Hamiton et al. | 395/829 |

OTHER PUBLICATIONS

PCI Specification Revision 2.0, PCI Local bus, PCI Press Edition, pp. 56–64.
Sébastien Tyrrell et al., "Dynamic Software Configuration Control In Telecommunications Systems," Proceedings of the Fifth RACE TMN Conference, pp. 1–14.

*Primary Examiner*—Alyssa H. Bowler
*Assistant Examiner*—Dzung C. Nguyen
*Attorney, Agent, or Firm*—Skjerven, Morrill, MacPherson, Franklin and Friel LLP; Brian D. Ogonowsky

[57] ABSTRACT

A peripheral device, connected to an address bus, which has yet to be assigned an I/O address has a pin connected to a configuration select output of a control logic circuit (or a CPU). The peripheral device is reset upon start-up of the system and is not yet required to respond to normal bus accesses or traffic. The CPU analyzes the available addresses in the address space and selects an available I/O address for assignment to that peripheral device. In one embodiment, the CPU then sends a serial bit stream containing the selected I/O address to that peripheral device over a configuration select line. In another embodiment, the CPU asserts a configuration select signal to the peripheral device. The CPU then transmits the selected I/O address to the peripheral device on the address bus. The transmitted I/O address is then stored in the peripheral device, and the device will now respond to this I/O address during subsequent operation of the system. In this way, the peripheral device is assigned an I/O address prior to that device having to interact or become active on the address bus or in the I/O address space.

22 Claims, 3 Drawing Sheets

AUTOMATIC ASSIGNMENT OF I/O ADDRESSES IN A COMPUTER SYSTEM

FIELD OF THE INVENTION

This invention relates to computer systems and, in particular, to a method and structure used for assigning addresses to devices connected to a bus.

BACKGROUND OF THE INVENTION

A typical computer system includes a central processing unit (CPU), such as a microprocessor, connected either directly or through control logic to an address bus and a data bus. In certain systems, the address bus and data bus are the same, and the address and data signals are multiplexed. Connected to the address and data bus are other devices which communicate with the CPU. Such devices may be in the form of chips, cards, or peripheral equipment. These devices will be referred to as peripheral devices.

In order for the CPU to communicate with a specific one of a number of peripheral devices connected to the same bus, the CPU must first transmit on the address bus the input/output (I/O) address of the device which the CPU desires to communicate with. The various peripheral devices have been previously programmed with their unique I/O address so that, when the address outputted by the CPU matches the preassigned address of the peripheral device, the peripheral device will then act upon the data following the address. If the addresses do not match, the peripheral device ignores the data.

The allocated I/O addresses are also stored in a memory (or specified in a program) for access by the CPU so that the CPU can generate the proper I/O addresses for communicating with the peripheral devices.

The number of possible addresses which may be assigned to peripheral devices are limited. This range of possible addresses is referred to as an address space. Various ways to set the I/O address within a peripheral device include: using jumpers; setting a DIP switch; manually programming an I/O address for storage in the peripheral device (called a software configurable address); and manufacturing the peripheral device to have a fixed address. The IBM® PC architecture, or Industry Standard Architecture (ISA), in particular has commonly provided peripheral devices with fixed addresses which have become industry standards. Such standard fixed addresses preclude these addresses from being assigned to other peripheral devices. In the case where an address of a peripheral device is not fixed by the manufacturer, the user must somehow identify an available address in the address space and select one available address as an I/O address for the peripheral device. When a large number of peripheral devices are available from many different manufacturers, identifying such an available address becomes difficult, and the likelihood that two peripheral devices may be inadvertently assigned the same address increases.

What is needed is a method and system for automatically generating I/O addresses for peripheral devices which do not require user intervention.

SUMMARY

In one embodiment, a memory of a computer system having an address and data bus (or combined address and data bus) is programmed to contain all input/output (I/O) addresses previously allocated to the peripheral devices connected to the address/data bus and the standard fixed I/O addresses conventionally allocated to specific types of peripheral devices. In another embodiment, a range of initially available I/O addresses is programmed in memory. In another embodiment, the system automatically determines the addresses used by the actual peripheral devices connected to the address bus. In another embodiment a combination of any or all of the above options may be used.

A peripheral device, connected to the address bus, which has yet to be assigned an I/O address has a pin connected to a configuration select output of a control logic circuit (or a CPU). After the peripheral device is reset upon start-up of the system, the CPU analyzes the available addresses in the address space and selects an available I/O address for assignment to that peripheral device. In one embodiment, the CPU then sends a serial bit stream containing the selected I/O address to that peripheral device over a configuration select line. The serial bit stream is asynchronous and consists of a start bit, data bits, and a stop bit. This I/O address is now stored in the peripheral device, and the device will now respond to this I/O address during subsequent operation of the system. In this way, the peripheral device is assigned an I/O address prior to that device having to interact or become active on the address bus or in the I/O address space.

In another embodiment, the selected I/O address to be assigned to the peripheral device is transmitted in parallel over the address bus to the peripheral device. In this embodiment, the CPU asserts a configuration select signal to the peripheral device. The CPU then transmits the selected I/O address to the peripheral device on the address bus. This I/O address is then stored in the peripheral device. The peripheral device will then respond to this address in the future. The configuration select signal is then deasserted to prevent subsequent addresses on the address bus from changing the stored I/O address of the peripheral device.

DETAILED DESCRIPTION OF THE PREFERRED EMBODIMENTS

Figure 1:
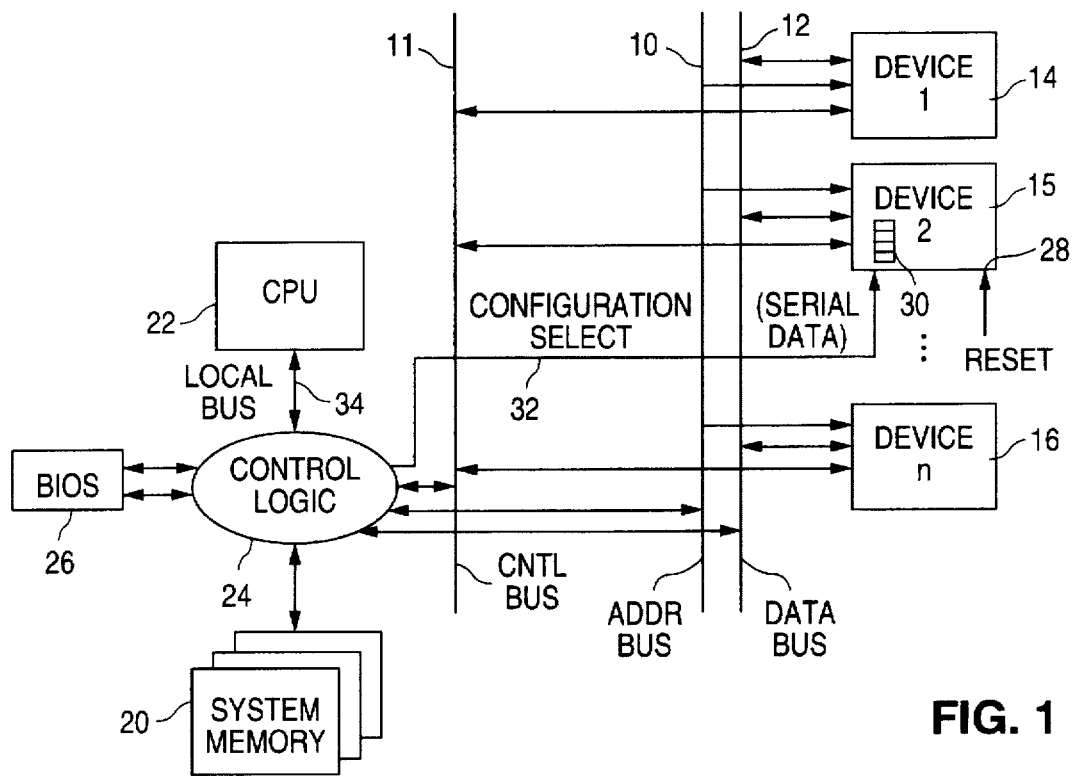
FIG. 1 illustrates a configuration of a computer system in accordance with the invention which automatically programs a peripheral device with a serially transmitted I/O address.

FIG. 1 illustrates a computer system which would allow a PC host system or other computer system to analyze an I/O address space and automatically assign I/O addresses to one or more peripheral devices without these devices having to interact or become active in the I/O address space first.

FIG. 1 shows a typical Industry Standard Architecture (ISA) bus comprising an address bus 10, a control bus 11, and a data bus 12. The ISA bus is the standard bus for all IBM PCs. The address bus 10 and data bus 12 are each 16 bits wide. Peripheral devices 14, 15, and 16 are shown connected to the address bus 10, control bus 11, and data bus 12. These peripheral devices may be chips, cards, printers, or any other device. Devices 14 and 16 illustrate conventional devices having their I/O addresses set in any conventional manner, such as using jumpers, DIP switches, or fixed by the manufacturer. The address identities of devices 14 and 16 are programmed into the system memory 20 (or any other memory, such as BIOS ROM 26) so that CPU 22 (or any microprocessor) can direct data to a specific one of the various devices 14 and 16 connected to the buses 10–12. Device 15 has no predetermined address, and its I/O address will be set as described below. Many more devices 14, 15, and 16 may be connected to buses 10–12. More devices other than device 15 could be attached to buses 10–12 and have no predetermined addresses at this time.

In the particular embodiment shown in FIG. 1, a control logic 24 circuit acts as an interface between the CPU 22 and the buses 10–12. Control logic 24 manages the address and data traffic on buses 10 and 12 such as by performing arbitration, buffering, and timing of the various signals on buses 10 and 12. In this way, CPU 22 is freed to perform calculations while control logic 24 is ensuring that address and data information is being properly communicated over the address bus 10 and data bus 12.

A conventional BIOS ROM 26 is used to initially set up the system.

The memory 20, CPU 22, control logic 24, BIOS ROM 26, address bus 10, control bus 11, and data bus 12 are assumed to be conventional circuitry except for the improvements to these structures described herein.

Figure 2:
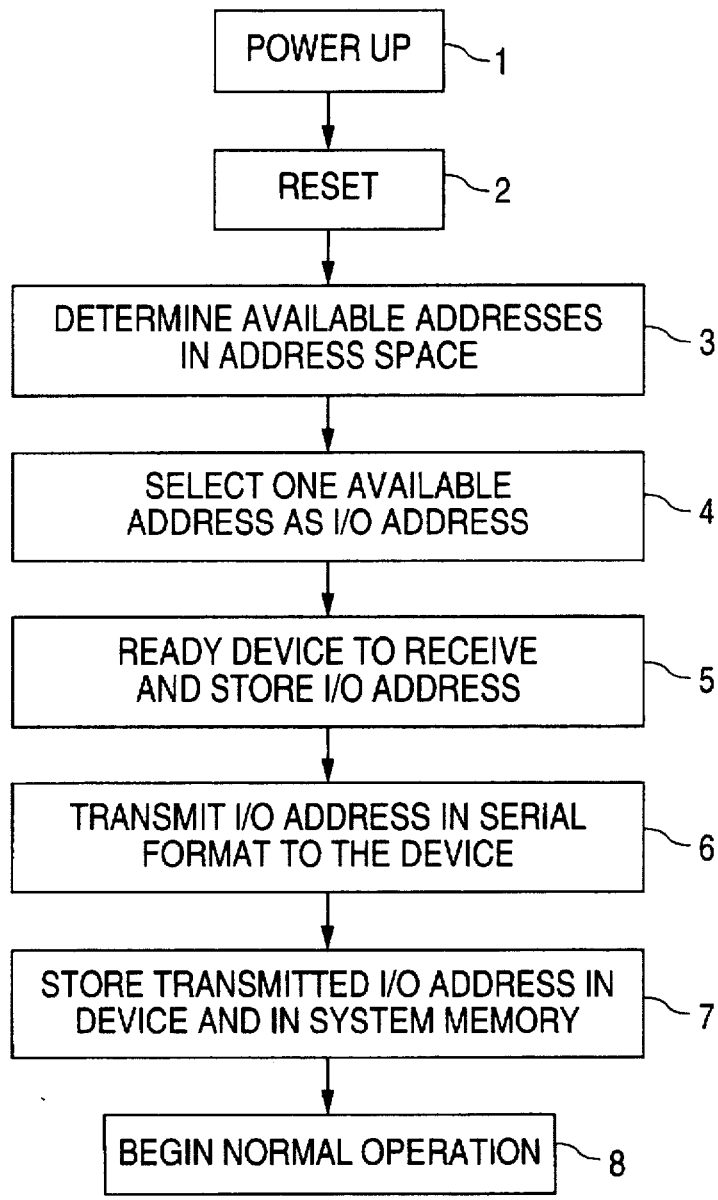
FIG. 2 is a flowchart illustrating one embodiment of a method carried out by the system of FIG. 1.

In a first step of a process to automatically set an I/O address for device 15, the system of FIG. 1 is powered up as shown in step 1 of FIG. 2.

In step 2, the BIOS ROM 26 controls the control logic 24 (and CPU if needed) to reset the devices 14, 15 and 16 (as well as the remainder of the system) by asserting a reset bit on the appropriate control line connected to the various reset ports of the devices 14, 15, and 16. FIG. 1 shows reset port 28 on device 15. This reset step may also include the BIOS program or a configuration program configuring the conventional devices 14 and 16 in a conventional manner by assigning predetermined or standard addresses to these devices 14 and 16.

In step 3, CPU 22 reads the various addresses from memory 20 (or BIOS ROM 26) which have already been assigned to the various devices, such as devices 14 and 16, connected to the address bus 10 and data bus 12 to determine the available addresses in the address space. In an alternative embodiment, memory 20 or BIOS ROM 26 is programmed to simply convey a range of initially available I/O addresses to CPU 22. In another embodiment, CPU 22 can poll the various devices 14 and 16 to determine the allocated I/O addresses.

In step 4, CPU 22 selects one of the available I/O addresses for transmission to device 15. If this is a standard or known I/O device, CPU 22 may assign it a particular address (if available) normally associated with such a device.

In step 5, the device 15 is controlled to be readied for receiving and storing a selected I/O address. More specifically, device 15 detects a control signal (which may be a start bit on configuration select line 32) and configures an internal register 30 to receive an I/O address to be subsequently transmitted on configuration select line 32. This control signal may also be the reset signal from step 2.

In step 6, CPU 22 outputs the selected I/O address to control logic 24 via local bus 34. Control logic 24 then transmits this I/O address serially over the configuration select line 32.

In step 7, the serial address is then stored in register 30 internal to device 15. Register 30 may be a shift register or other suitable memory device. A stop bit or other control signal may then be used, if desired, to signal the end of the serial I/O address transmission. Virtually any serial data format may be used, whether synchronous or asynchronous. The I/O address stored in register 30 is also stored in a memory, such as memory 20, for access by CPU 22 when CPU 22 desires to communicate with device 15. For example, the selected I/O address may be stored in a specified location in a RAM.

The use of control logic 24, as would be well known, may be optional depending upon the type of CPU 22 or microprocessor used.

Device 15 contains conventional decoding circuitry to compare any address subsequently transmitted on address bus 10 to the contents of register 30 to determine whether a match exists. If a match exists, then device 15 will act on the data transmitted on data bus 12 in a conventional manner.

The circuitry and software/firmware required to carry out the above process would be understood by those skilled in the art after reading this disclosure.

In step 8, the system of FIG. 1 begins its normal operation with all elements in FIG. 1 performing a conventional function. The configuration select line 32 may be multiplexed so that, in the normal operation of the system, line 32 can have another function.

In one embodiment, the serial bit stream transmitted over configuration select line 32 is asynchronous and consists of one start bit, 16 or 32 or 64 data bits representing the assigned I/O address, and one stop bit. The serial bit stream may also contain a parity bit. In another embodiment, the data portion of the bit stream may contain only one byte of data, and the transmission format would have to be repeated as necessary to transmit the entire address to the device 15. In the embodiment shown in FIG. 1, register 30 in device 15 may be updated at any time with a new address serially transmitted over configuration select line 32. Device 15 contains the necessary logic to decode the start bit, stop bit, and any parity bit. Such conventional decoding circuitry would be well known to those skilled in the art and will not be discussed in detail.

When the system of FIG. 1 is powered down, the I/O address assigned to device 15 will be lost if register 30 is a volatile memory, and the method shown in FIG. 2 will have to be repeated when the system is again powered up.

In an actual embodiment, there may be many devices connected to buses 10 and 12 having configurable address circuitry identical to that of device 15. Additionally, there may be many chips on a single device card which must be separately addressable by an I/O address on bus 10. In such a case, each device (similar to device 15) or chip must have a different I/O address selected by CPU 22. To store the selected I/O address in the proper device, either a designated configuration select line 32 is connected to each device or each device may respond to a predetermined and unique key code on the data bus 12. Such a key code may be the serial number of the device, a manufacturer's ID or part number, or a generic code for that particular type of device. Other key codes can be assigned arbitrarily. This key code would be programmed in memory 20 (or other memory) and programmed in the device itself (e.g. using jumpers, DIP switches, register 30, or fixed by the manufacturer). Thus, when CPU 22 is setting up the various I/O addresses, the CPU 22 selects both a stored key code and an I/O address to be assigned to the device having that key code. The CPU 22 then sends the key code over the data bus 12, which is then detected by the various devices. If there is a match between the transmitted key code and the device's key code, the device whose key code matched the transmitted key code then reads and stores the I/O address serially transmitted on configuration select line 32. Such key code decoding circuitry would be apparent to those skilled in the art after reading this disclosure. A different key code may be selected for each separately addressable chip or circuit contained on a single plug-in card connected to bus 10.

Other ways to designate a particular device connected to buses 10 and 12 for setting its I/O address may also be suitable.

Figure 3:
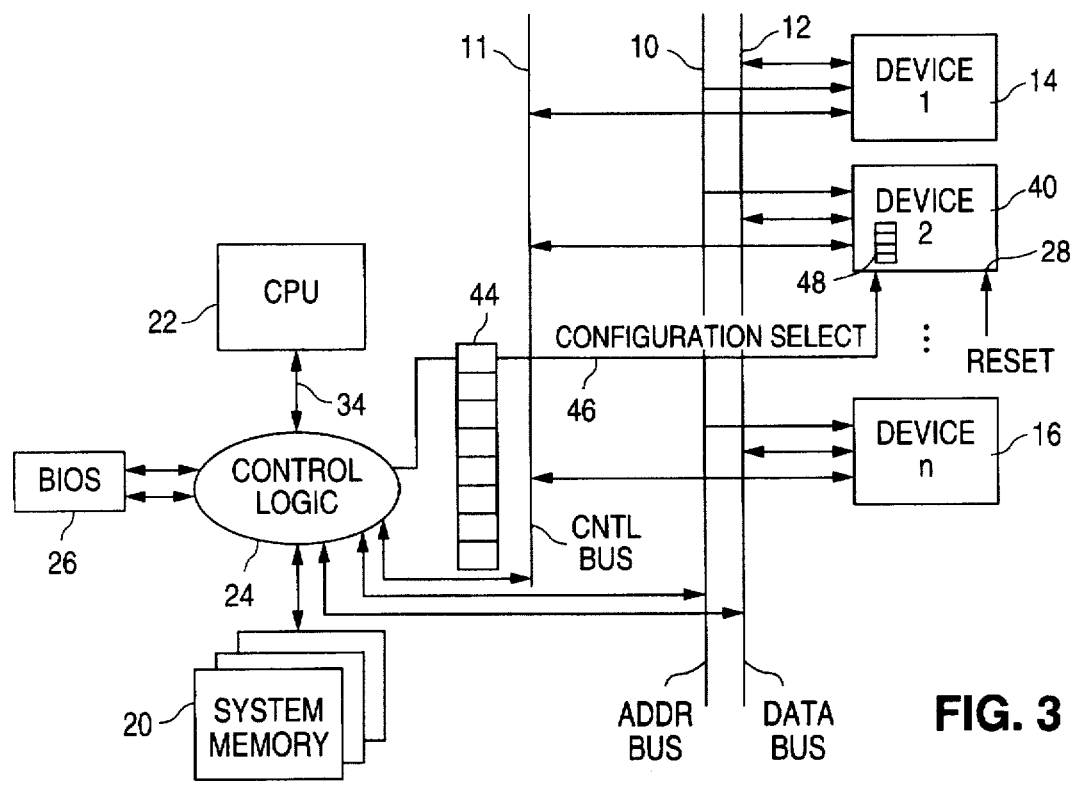
FIG. 3 illustrates another embodiment of a computer system in accordance with the invention which automatically programs a peripheral device with an address transmitted in parallel.

FIG. 3 illustrates another embodiment of the invention where CPU 22 automatically selects an I/O address for assignment to device 40. The selected I/O address is then transmitted in parallel on address bus 10 and stored internal to device 40.

In the configuration of FIG. 3, the I/O address for device 40 is configured as follows.

Figure 4:
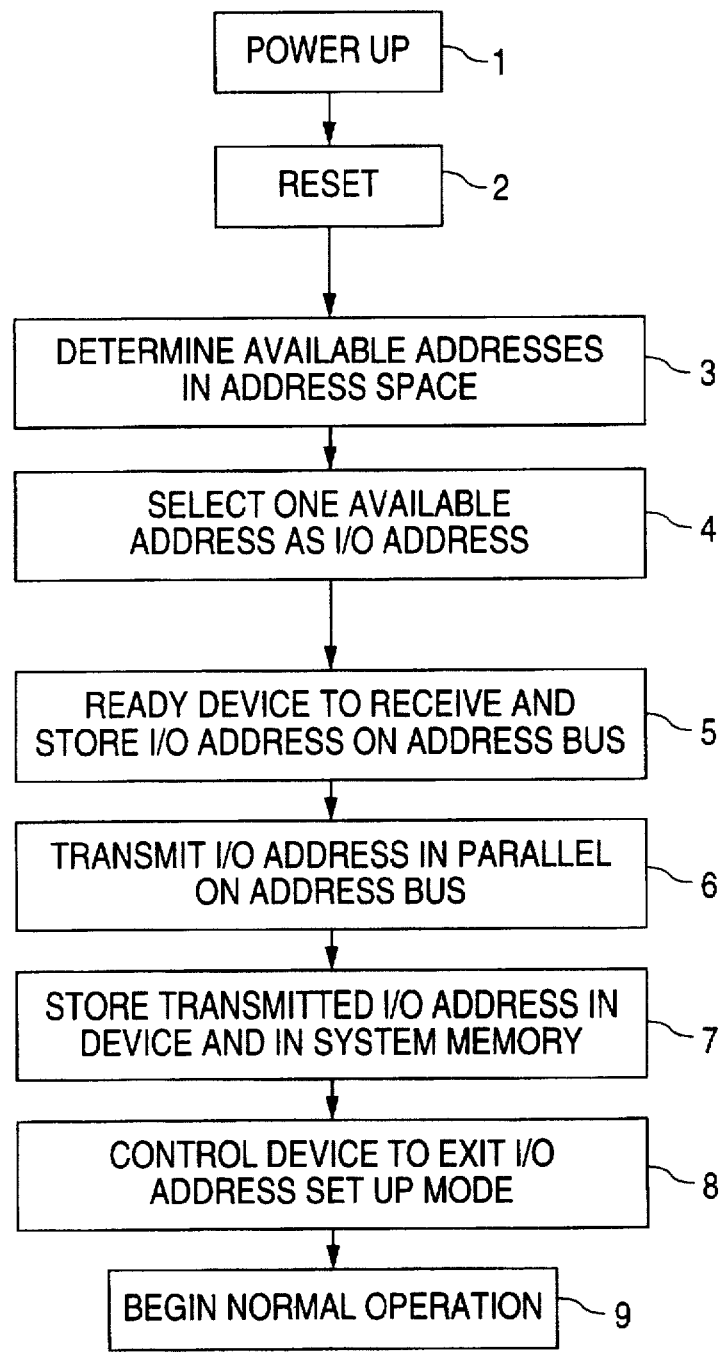
FIG. 4 is a flowchart illustrating one embodiment of a method carried out by the system of FIG. 3.

In step 1, shown in FIG. 4, the system is powered up.

In step 2, the BIOS ROM 26 controls the control logic 24 circuit to reset the various devices 14, 16, and 40 connected to the address bus 10 and data bus 12. Such resetting is performed using conventional circuitry and methods where a reset bit on a control line is applied to the respective reset ports of the devices 14, 16, and 40. FIG. 3 shows reset port 28 of device 40. As with step 2 in FIG. 2, this reset step may also include the BIOS program or configuration program assigning predetermined addresses to the conventional devices 14 and 16.

In step 3, CPU 22 reviews the I/O addresses stored in memory 20 (or any other memory) which have been already assigned to the various devices, such as devices 14 and 16, connected to the buses 10 and 12 or otherwise allocated. In another embodiment, the available I/O addresses are automatically communicated to CPU 22 in a different manner, such as described with respect to FIG. 1.

In step 4, CPU 22 selects one of the appropriate and available addresses in the address space for identifying the I/O address of device 40.

In step 5, CPU 22 generates a signal for causing control logic 24 to set a configuration select bit in latch 44. This configuration select bit is then transmitted over a configuration select line 46 to an input of device 40. The detection of this configuration select bit by device 40 causes device 40 to be readied for reading an address on address bus 10 for storage in register 48.

In step 6, CPU 22 controls control logic 24 to transmit the selected I/O address in parallel over address bus 10.

In step 7, the I/O address on address bus 10 is stored in register 48 in device 40. The I/O address is also stored in the system memory 20 (or other suitable memory) for later access by CPU 22 when desiring to communicate with device 40.

In step 8, CPU 22 controls control logic 24 to deassert the configuration select bit in latch 44 so that the contents of register 48 will be frozen until the configuration select bit is again reasserted.

In step 9, normal operation of the system of FIG. 3 may then begin.

Device 40 contains conventional address decoding circuitry which subsequently compares an address on address bus 10 to the I/O address previously stored in register 48 to determine whether a match exists. If a match exists, device 40 will then operate on the data transmitted on the data bus 12 in a conventional manner.

In an actual embodiment, a number of devices similar to device 40 may be connected to the buses 10–12. To select one of the devices for setting its I/O address, in one embodiment, a separate configuration select line 46 may be connected to each device. A different bit set in latch 44 may be used to control which device is to store the I/O address on address bus 10 in its internal register 48.

In an alternate initialization process carried out by the structure of FIG. 3, a data key may be generated by CPU 22 to identify which one of a plurality of devices is to store an I/O address on address bus 10 in its internal register 48. Such a data key may be used instead of providing a separate configuration select line 46 to each device. For example, device 40 may be initially programmed with a fixed data key code, as previously described with respect to FIG. 1. In order to store an I/O address in register 48, this key code should be generated by CPU 22 on data bus 12 concurrent with the configuration select signal on line 46. Device 40 detects the matching of the key code on the data bus 12 with the key code previously stored in device 40 and operates to store the I/O address on bus 10 into register 48.

The data key code may correspond to a particular type of device 40, such as a sound board or modem card. Such a pre-established key code could be previously stored in the BIOS ROM with the assumption that such a sound board or other device may eventually be connected to the address bus 10 and data bus 12 and that such a sound card would contain a corresponding key code. The key code may instead be the manufacturer's ID number of the device, which may also be previously stored in the BIOS ROM 26 or system memory 20. The key code may also be programmed by the user as the serial number of the device.

In one embodiment, the device 40 must be reconfigured each time the system is powered up since its I/O address is not permanently stored in register 48. However, if register 48 is a non-volatile memory, then there may be no need to set the I/O address of device 40 each time the system is powered up.

Thus, an automated I/O addressing scheme has been described which automatically generates and assigns an I/O address for a device connected to an address and data bus prior to the device becoming active in the I/O address space. This technique allows a device to be assigned an I/O address within an extremely crowded address space without any intervention by the user.

The embodiments of FIG. 1 and 3 may be easily fabricated by one of ordinary skill in the art after reading the above disclosure. The methods of FIGS. 2 and 4 can be easily implemented in software or firmware.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for automatically assigning I/O addresses to one or more devices connected to a bus, comprising the steps of:

initiating, by a processor without said one or more devices' intervention, said method by said processor issuing a reset signal for resetting said one or more devices and reading I/O addresses from storage locations;

identifying, by said processor without a user's intervention, available I/O addresses in an address space;

selecting, by said processor without said user's intervention, one available I/O address for transmission to a first device connected to said bus;

transmitting, by said processor without said user's intervention, said one available I/O address to said first device for storage in said first device as an I/O address for said first device; and addressing said first device using said I/O address stored in said first device.

2. The method of claim 1 wherein said I/O address is transmitted to said first device serially.

3. The method of claim 1 wherein said I/O address is transmitted to said first device over said bus in a parallel manner.

4. The method of claim 1 further comprising the step of generating a configuration select signal coupled to an input of said first device to identify to said first device that a transmitted I/O address is ready to be stored in said first device for use as an I/O address for said first device.

5. The method of claim 4 wherein said configuration select signal is a start code and said I/O address is transmitted serially following said start code.

6. The method of claim 4 wherein said configuration select signal is a signal transmitted over a conductive line to said first device signalling to said first device that an I/O address transmitted over said bus is to be stored in said first device for use as an I/O address for said first device.

7. The method of claim 1 wherein said I/O address is transmitted serially to said first device in an asynchronous manner over a conductive line which is not part of an address bus or a data bus.

8. The method of claim 1 further comprising the step of generating a key code for decoding by said first device to determine whether a transmitted I/O address is to be stored in said first device.

9. The method of claim 8 wherein said key code is transmitted over said bus.

10. The method of claim 9 wherein said bus includes an address bus and a data bus, and said key code is transmitted over said data bus.

11. The method of claim 1 wherein said bus comprises an address bus.

12. The method of claim 11 wherein said bus further comprises a data bus.

13. The method of claim 1 further comprising the step of storing said selected I/O address in a memory for later access by said processor when desiring to communicate with said first device.

14. The method of claim 1 further comprising the steps of automatically assigning an I/O address to a second device connected to said bus using said steps of identifying, selecting, and transmitting.

15. A system for automatically assigning I/O addresses to one or more devices connected to a bus comprising:

a processor for initiating a routine, without said one or more devices' intervention, for automatically assigning I/O addresses to said one or more devices by resetting said one or more devices and reading I/O addresses from storage locations;

means for automatically identifying available I/O addresses in an address space;

means for automatically selecting one available I/O address for transmission to a first device connected to said bus;

means for automatically transmitting said one available I/O address to said first device for storage in said first device as an I/O address for said first device; and means for addressing said first device using said I/O address stored in said first device.

16. The system of claim 15 further comprising:

means for automatically selecting one available I/O address for transmission to a second device connected to said bus;

means for automatically transmitting said one available I/O address to said second device for storage in said second device as an I/O address for said second device; and means for addressing said second device using said I/O address stored in said second device.

17. The method of claim 8 wherein said key code is previously stored in a memory prior to initializing said method.

18. The method of claim 17 wherein said memory is a BIOS ROM.

19. The method of claim 8 further comprising the step of transmitting said I/O address to said first device to be stored in said first device when said key code matches a key code of said first device.

20. The system of claim 15 further comprising:

means for generating a key code for said first device to determine whether a transmitted I/O address is to be stored in said first device.

21. The system of claim 15 further comprising:

means for assigning a key code unique to a device lacking an I/O address.

22. The system of claim 20 further comprising:

a ROM for storing said key code prior to said processor initiating said routine.

* * * * *